United States Patent [19]

Cwycyshyn et al.

[11] 3,738,481

[45] June 12, 1973

[54] VEHICLE POSITIONING AND RESTRAINT APPARATUS

[75] Inventors: Walter Cwycyshyn, Detroit; Elwyn L. Kitchen, Jr., Troy, both of Mich.

[73] Assignee: General Motors Corporation, Detroit, Mich.

[22] Filed: Oct. 8, 1971

[21] Appl. No.: 187,626

[52] U.S. Cl. ........ 206/46 M, 105/368 R, 248/119 R
[51] Int. Cl..... B60p 7/08, B61d 45/00, B65d 85/00
[58] Field of Search .................... 206/46 M, 46 H; 280/179 A; 105/368 R, 368 T, 369 A; 296/1 A; 248/119 R, 361 R

[56] References Cited
UNITED STATES PATENTS

| | | | |
|---|---|---|---|
| 1,254,920 | 1/1918 | Mathias | 105/368 R |
| 1,780,277 | 11/1930 | Seeley et al. | 248/119 R |
| 2,521,088 | 9/1950 | Phelps | 206/46 M |
| 3,189,313 | 6/1965 | Burns et al. | 248/361 |
| 3,605,636 | 9/1971 | Blunden et al. | 248/119 R |
| 3,659,533 | 5/1972 | Venditty | 105/368 T |

*Primary Examiner*—William T. Dixson, Jr.
*Attorney*—J. L. Carpenter and E. J. Biskup

[57] ABSTRACT

A vehicle positioning and restraint apparatus having a latch mechanism and parallel guide rails which slidably receive tie-down devices attached to the underside of a vehicle for holding the vehicle in a locked position during shipment by a carrier.

3 Claims, 6 Drawing Figures

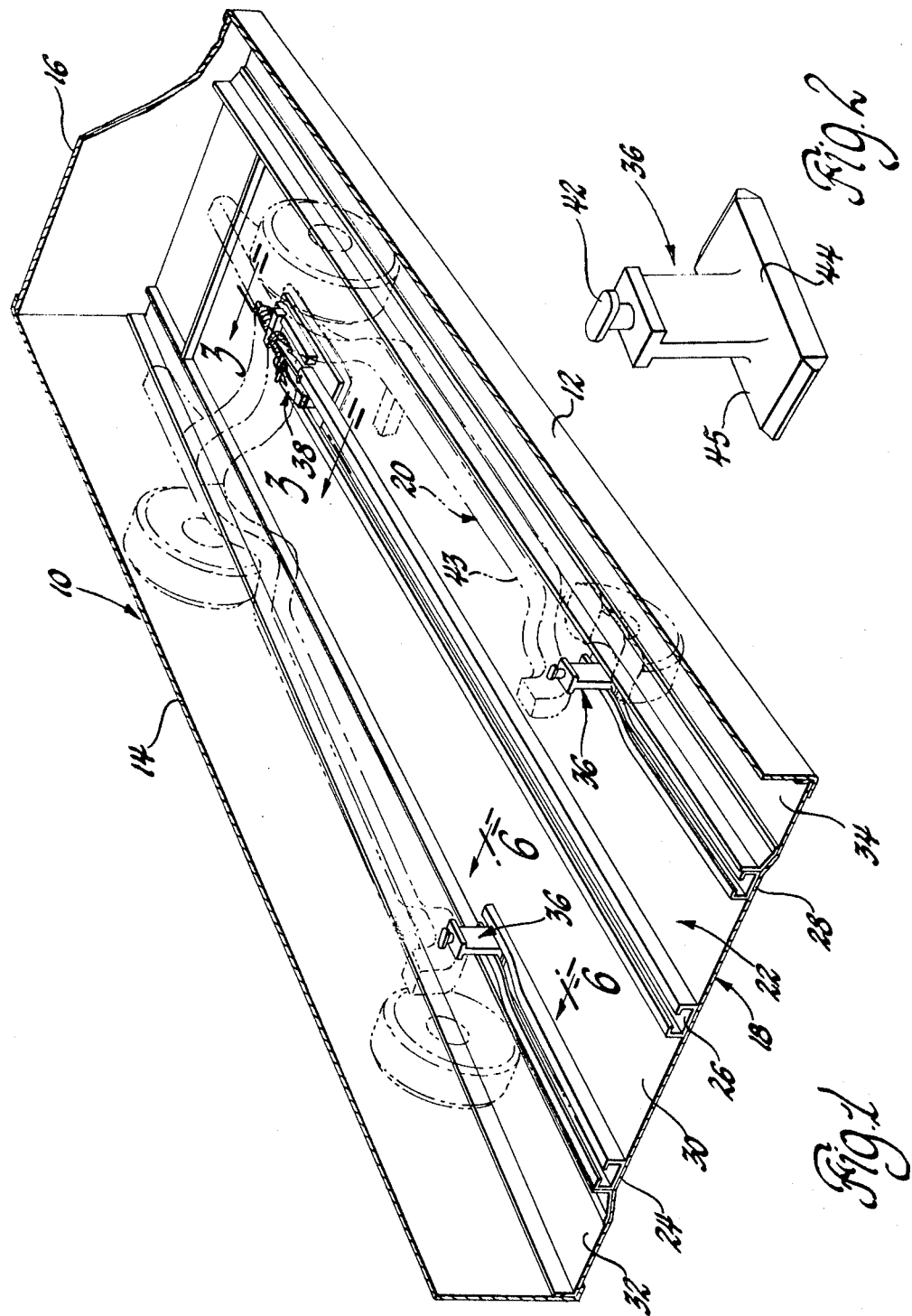

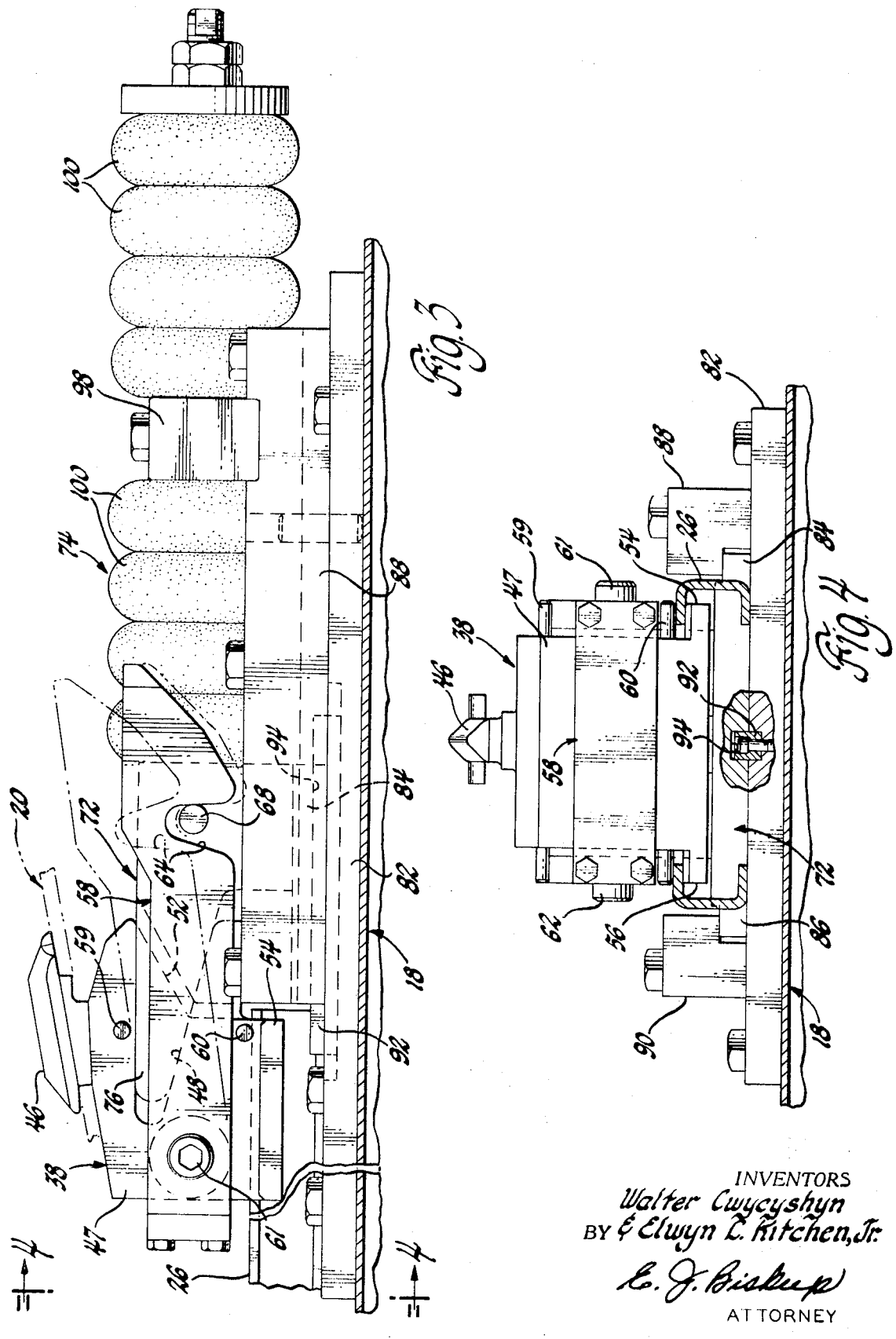

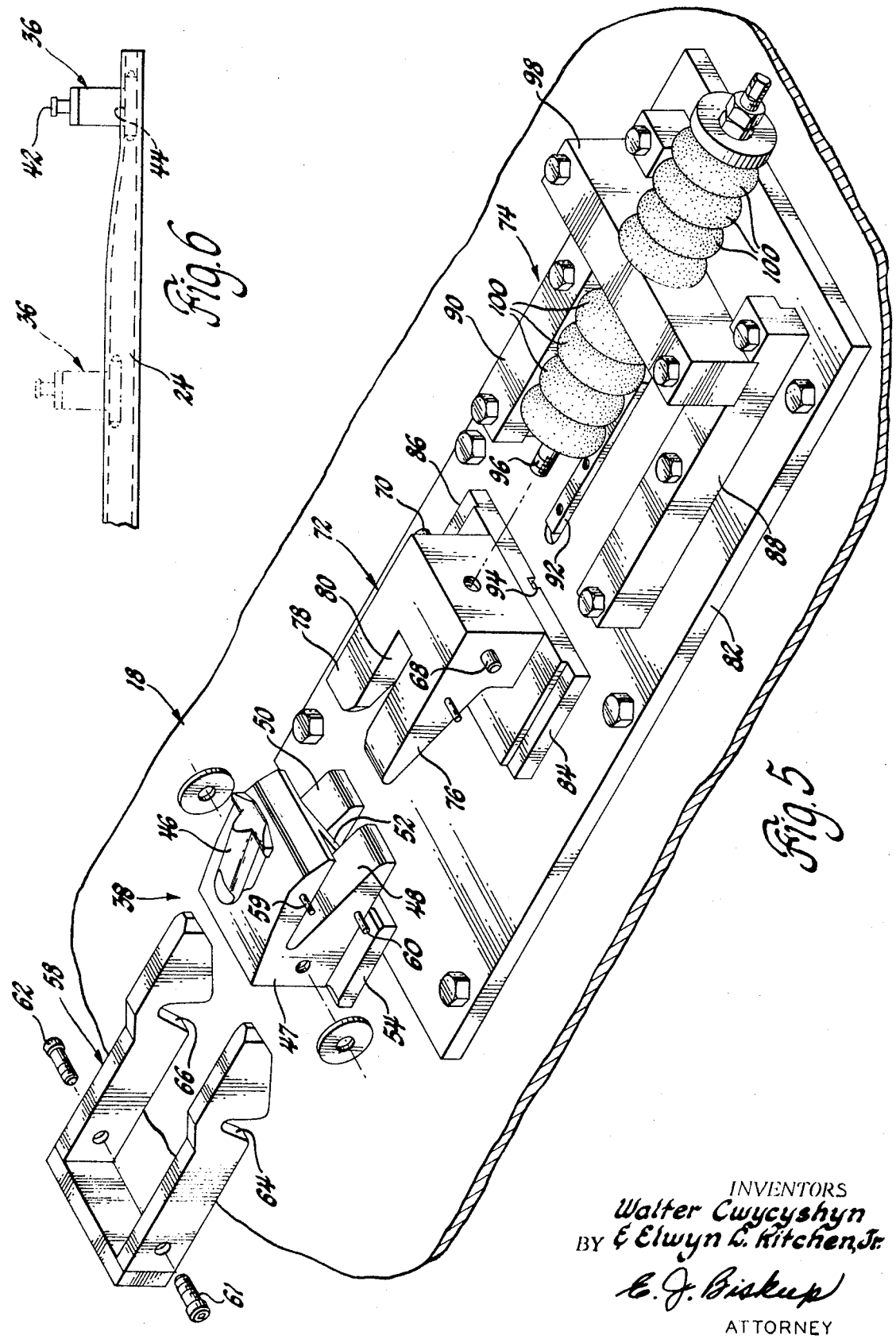

VEHICLE POSITIONING AND RESTRAINT APPARATUS

This invention concerns an apparatus for positioning and securing automotive vehicles during shipment on railway or highway carriers.

Copending patent application A-15,753, entitled "Vehicle Positioning and Restraint Apparatus," in the name of Cwycyshyn et al, and assigned to the assignee of this invention, concerns a restraint system which is intended to permit loading and securing of vehicles in a narrow fully enclosed shipping container so as to facilitate loading the prevent vehicle movement during shipment. The arrangement disclosed in the latter-mentioned application includes three parallel guide rails which cooperate with and slidably receiver three tie-down devices attached to the underside of the vehicle. The outer guide rails incorporate latching mechanisms which are manually operated and serve to trap the associated tie-down device and prevent it, and accordingly the vehicle, from moving in a direction extending longitudinally of the shipping container. The present invention relates to a similar restraint system but in this case utilizes a latching mechanism which is associated with the center guide rail and is adapted to automatically lock the center tie-down device from movement in a longitudinal direction.

In this regard and in the preferred form, the apparatus made according to the present invention includes three elongated parallel guide rails which are adapted to be fixed to the floor portion of the carrier along the longitudinal axis of the latter. The guide rails are equally spaced from each other and each is adapted to receive a tie-down device fixed to the vehicle for restraining the latter from movement in a vertical direction. The center guide rail terminates with a latching mechanism for restraining the associated tie-down device from fore and aft movement. The latching mechanism comprises a base which resiliently supports a carriage for limited movement. A pair of laterally extending pins are integrally formed with the carriage and are adapted to cooperate with a pivoted hook member mounted on the tie-down device for locking the latter in position when the vehicle assumes a predetermined position along the guide rails.

The objects of the present invention are to provide a three-point positioning and restraint apparatus for vehicles which includes a centrally located automatic latching mechanism for preventing movement of the vehicle in a fore and aft direction when the vehicle assumes a predetermined position along a support floor; to provide a latching mechanism to be mounted to a center guide rail which receives a tie-down device secured to the frame of a vehicle; to provide a latching mechanism that has cushioning means incorporated therewith for cooperation with 2 pivoted hook carried by a vehicle for securing the latter to a carrier; to provide a vehicle shipping container having three parallel guide rails formed therein for receiving three tie-down devices connected to the underside of a vehicle so as to position the vehicle in the shipping container and maintain the vehicle from vertical, lateral, or longitudinal movement; to provide a tie-down device for a vehicle that cooperates with a guide rail for providing lateral and vertical stability to a vehicle and also carries a pivoted hook member which is automatically engageable with a device located at the end of the guide rail for preventing fore and aft movement of the vehicle.

Other objects and advantages of the present invention will be apparent from the following detailed description when taken with the drawings in which:

FIG. 1 is a perspective view showing a part of a shipping container incorporating a positioning and restraint apparatus made according to the invention;

FIG. 2 is a perspective view showing the rear tie-down device used with this invention;

FIG. 3 is an enlarged sectional view taken on line 3—3 of FIG. 1 and showing the latching mechanism incorporated with the center guide rail of the apparatus shown in FIG. 1;

FIG. 4 is a view taken on line 4—4 of FIG. 3;

FIG. 5 is an exploded view of the latching mechanism shown in FIGS. 3 and 4, and FIG. 6 is a side elevational view taken on line 6—6 of FIG. 1 and shows a portion of the outer guide rail used with this invention.

Referring to the drawings and more particularly FIG. 1 thereof, a shipping container 10 is shown comprising side walls 12 and 14, an end wall 16, and a floor portion 18. This shipping container is similar to that illustrated in the aforementioned patent application and is intended to have multiple decks or floor portions, each of which is adapted to accommodate a vehicle, the chassis 20 of which is shown in phantom lines. A positioning and restraint apparatus 22 is incorporated with each floor portion 18 of the shipping container 10 for holding the vehicle in place when the shipping container is in transit on a carrier such as a railway car.

In this regard, it will be noted that the positioning and restraint apparatus 22 comprises three elongated guide rails 24, 26, and 28 which are located in parallel planes with equal spacing between adjacent guide rails. Each guide rail is a channel member which in cross section is C-shaped and is fixedly secured to a raised planar portion 30 that has parallel tracks 32 and 34 located on the opposite sides thereof. As should be apparent, the tracks 32 and 34 serve to accommodate the tires of the vehicle as the latter moves into the shipping container 10. Each of the outer guide rails 24 and 28 is adapted to receive a tie-down device 36 shown in FIG. 2, while the center guide rail 26 is adapted to receive a tie-down device 38 shown in FIGS. 3-5. In other words, as seen in FIG. 1, three tie-down devices are adapted to be secured to the vehicle chassis 20 so as the vehicle is rolled into the open end of the shipping container 10, the tires are accommodated by the tracks 32 and 34 and each of the tie-down devices slides within one of the guide rails and serves to position the vehicle as well as prevent lateral and vertical movement thereof.

As seen in FIG. 2, the tie-down device 36 is formed with a key portion 42 which is adapted to be inserted within an oblong opening located adjacent the rear end of the vehicle frame 43 inboard of the rear tire. The tie-down device 36 is then rotated 90° to lock the device to the vehicle frame 43 in the position shown in FIG. 1 wherein laterally extending arms 44 and 45 are located in a plane transverse to the longitudinal axis of the vehicle chassis.

Similarly, the tie-down device 38 for the center guide rail 26 is formed with a key portion 46 which is adapted to extend into an oblong slot formed in the front cross member of the vehicle frame 43 and be locked thereto. As seen in FIG. 5, the body portion 47 of the tie-down device 38 rigidly supports the key portion 46 and is formed with two identical V-shaped cutouts 48 and 50 on opposite sides of a vertical wall 52. In addition, the body portion 47 is integrally formed with laterally extending arms 54 and 56 which are adapted to slide within the center guide rail 26. A U-shaped hook member 58 is connected to the body portion 47 by a pair of pivot pins 61 and 62 which allow the hook member to pivot about a transverse horizontal axis between stop members 59 and 60. The hook member 58 includes transversely aligned V-shaped cutouts 64 and 66 which are adapted to respectively receive a pair of laterally extending lock pins 68 and 70 secured to a carriage 72 which forms a part of a cushioning device 74 located at the inner end of the center guide rail 26. The carriage 72 has a pair of cantilever type arms 76 and 78 separated by an opening 80. The arms 76 and 78 are complementary in form to and adapted to mate with the cutouts 48 and 50 in the tie-down device 38. Thus, when the tie-down device 38 engages the carriage 72 as shown in FIG. 3, the wall 52 moves within the opening 80 while the arms 76 and 78 move into the cutouts 48 and 50, respectively. Simultaneously, the front end of the hook member 58 is cammed upwardly by the lock pins 68 and 70 and then drops by gravity into engagement with the lock pins secured to the carriage so as to assume the position shown in full lines in FIG. 3.

The carriage 72 is slidably received by a base 82 which is bolted to the raised planar portion 30 of the floor portion 18. In this regard, it will be noted that the carriage 72 is formed with outwardly extending legs 84 and 86 which are slidably confined by a pair of block members 88 and 90 which are L-shaped in cross section and are secured to the base 82. A raised guide bar 92 extends parallel to and centrally of the block members 88 and 90 and is received by a longitudinally extending complementary groove 94 in the underside of the carriage 72. In addition, a longitudinally positioned threaded rod 96 is supported at its center axial movement by a base supported cross bar 98 and has one end threadably secured to the carriage 72. The rod 96 supports a plurality of identical doughnut-shaped rubber pads 100 located on opposite sides of the cross bar 98 and serving as cushioning means during movement of the carriage in a fore or aft longitudinal direction along the guide bar 92. In this manner, as the tie-down device 38 engages the carriage 72 as seen in FIG. 2, any continued movement of the tie-down device 38 in a rightward direction results in compression of the rubber pads 100 located between the carriage 72 and the cross bar 98.

It will be noted that as seen in FIG. 6, each of the outer guide rails 24 and 28 at the inner end thereof is progressively tapered downwardly so as to cause the associated tie-down device 36 to be drawn toward the floor as it moves from the phantom line position to the full line position and when the vehicle chassis assumes the position shown in FIG. 1. In this manner, the springs associated with the suspension system of the vehicle are preloaded so as to assure that the vehicle is retained in position and does not experience any movement during transit.

From the above description it should be apparent that as the vehicle enters the shipping container 10 with the tires in the tracks 32 and 34, the center tie-down device 38 initially enters the center guide rail 26. As the vehicle rolls forwardly into the shipping container 10 and just prior to the rear tires of the vehicle entering the shipping container, the rear tie-down devices 36 slide into the outer guide rails 24 and 28. The vehicle then continues to roll into the shipping container 10 until the center tie-down device 38 engages the cushioning device 74 in a manner as described above causing a locking action between the hook member 58 and the carriage 72. At such time, the vehicle is restrained from vertical and lateral movement by the three tie-down devices and longitudinal movement is prevented due to the latching action occurring between the center tie-down device 38 and the lock pins 68 and 70.

Various changes and modifications can be made in this construction without departing from the spirit of the invention. Such changes and modifications are contemplated by the inventors and they do not wish to be limited except by the scope of the appended claims.

We claim:

1. A positioning and restraint apparatus for shipping vehicles, comprising a generally rectangular floor portion adapted to support a vehicle, three elongated parallel guide rails fixed to said floor portion along the longitudinal axis of the latter, each of said guide rails adapted to slidably receive a tie-down device fixed to the underside of said vehicle for restraining the vehicle from movement in a vertical direction, a mechanism axially aligned with one of said guide rails for restraining the associated tie-down device from movement along said longitudinal axis, said mechanism comprising a base, a carriage supported in said base for movement along an axis parallel to said longitudinal axis, means connected between the carriage and the base for cushioning movement of the carriage along said longitudinal axis, and latching means including a pivoted hook member and lock pin means carried by the tie-down device and the carriage for automatically locking the tie-down device to said mechanism and thereby preventing movement of the vehicle along a longitudinal axis.

2. In combination with a portable container for shipping vehicles, a positioning and restraint apparatus comprising a floor portion located in a horizontal plane and adapted to support a vehicle, three elongated equally spaced parallel guide rails fixed to said floor portion along the longitudinal axis of the latter, each of said guide rails being C-shaped in cross section and adapted to receive a T-shaped tie-down device fixed to the underside of said vehicle for restraining the vehicle from movement in a vertical direction, a pivoted hook member carried by the tie-down device, a mechanism located at the end of one of said guide rails for restraining the associated tie-down device from movement along said longitudinal axis, said mechanism comprising a base, a carriage supported in said base for movement along the associated guide rail, means connected between the carriage and the base for cushioning movement of the carriage along said longitudinal axis, and lock pin means mounted on said carriage and adapted to cooperate with said pivoted hook member for automatically locking the tie-down device to said mechanism and thereby preventing movement of the vehicle along said longitudinal axis.

3. In combination with a container for shipping vehicles, a positioning and restraint apparatus comprising a floor portion located in a horizontal plane and adapted to support a vehicle, a pair of laterally spaced tracks formed on said floor portion for accommodating the wheels of said vehicle, three elongated parallel guide rails located between said tracks and fixed to said floor portion along the longitudinal axis of the latter, each of said guide rails adapted to slidably receive a tie-down device fixed to the underside of said vehicle for restraining the vehicle from movement in a vertical direction, a pivoted hook member carried by the tie-down device, a mechanism located at the end of the center guide rail for restraining the associated tie-down device for movement along said longitudinal axis, said mechanism comprising a base, a carriage supported in said base for movement along an axis parallel to said longitudinal axis, a plurality of elastomeric pads connected between the carriage and the base for cushioning movement of the carriage along said longitudinal axis, and lock pin means mounted on said carriage and adapted to cooperate with said pivoted hook member for automatically locking the tie-down device to said mechanism and thereby preventing movement of the vehicle along a longitudinal axis.

* * * * *